Dec. 24, 1940.  C. G. OLSON  2,225,654
FASTENER UNIT AND METHOD OF MAKING SAME
Filed Nov. 21, 1938  2 Sheets-Sheet 1
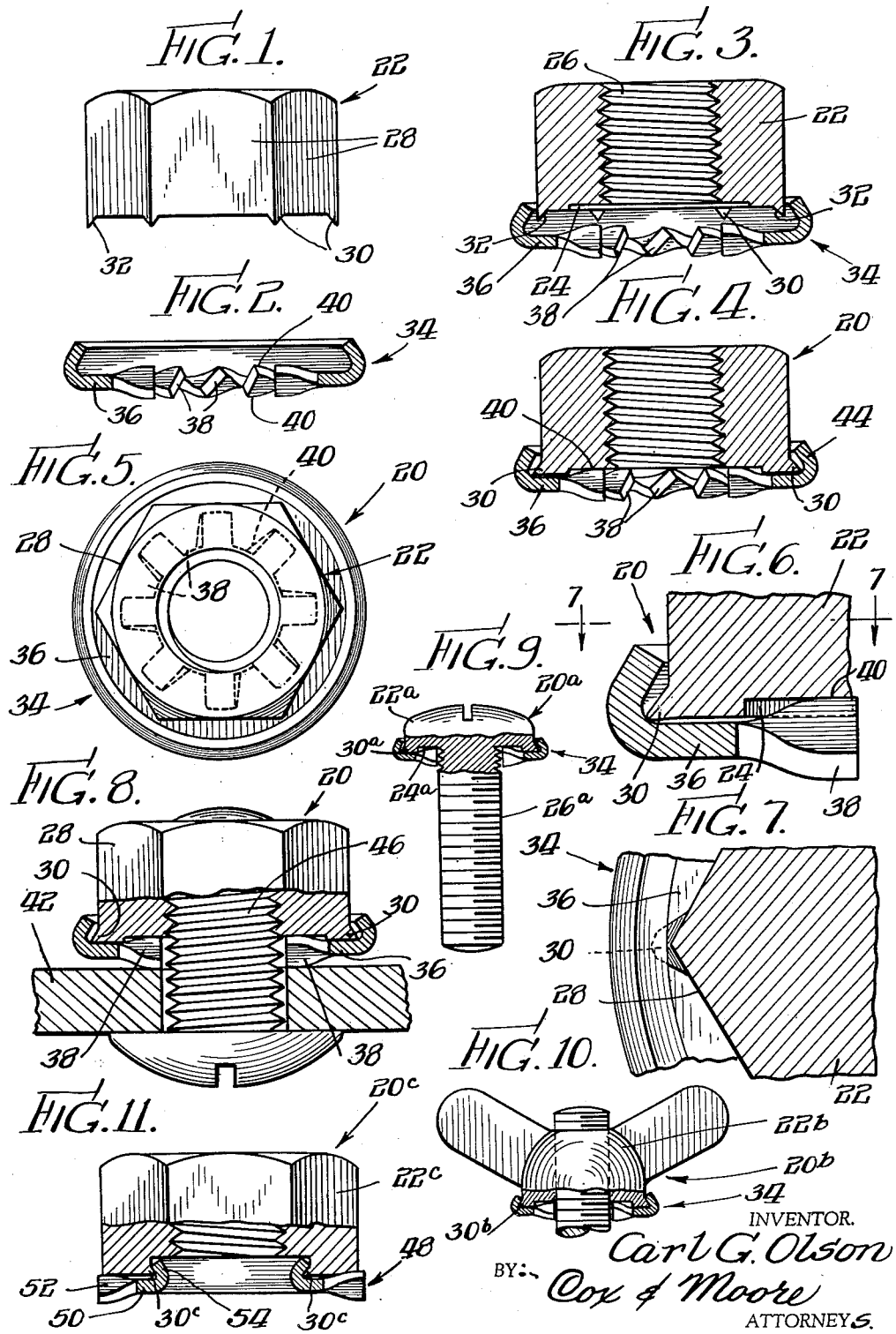
INVENTOR.
Carl G. Olson
BY Cox & Moore
ATTORNEYS.

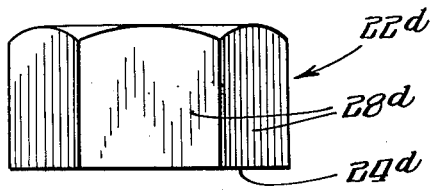
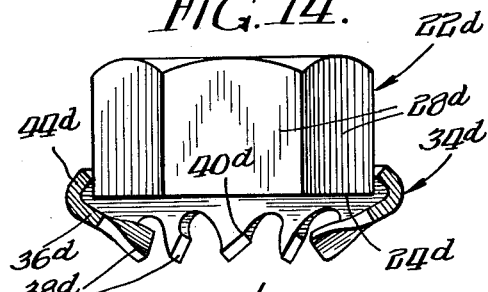
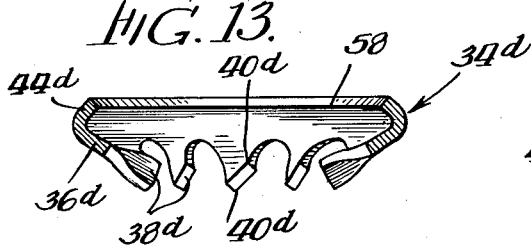
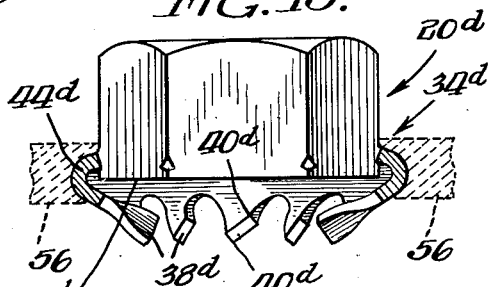
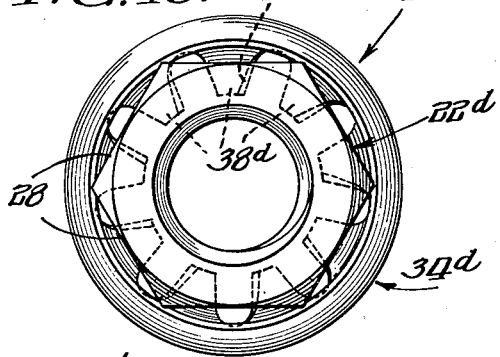
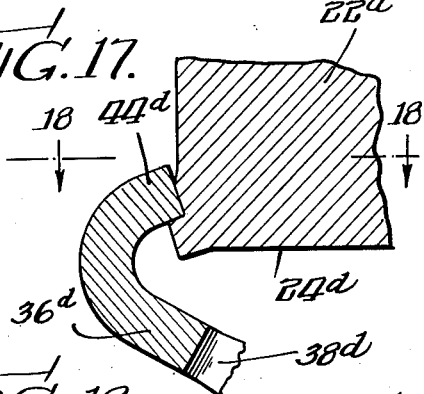
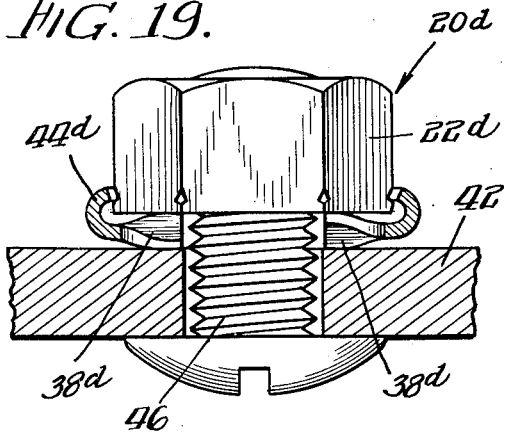
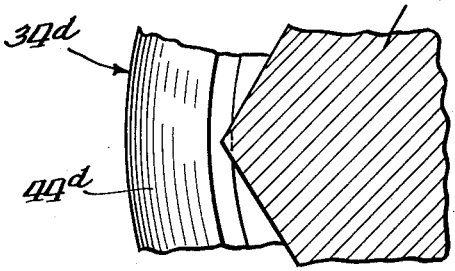

Patented Dec. 24, 1940

2,225,654

UNITED STATES PATENT OFFICE 2,225,654

FASTENER UNIT AND METHOD OF MAKING SAME

Carl G. Olson, Chicago, Ill., assignor to Illinois Tool Works, Chicago, Ill., a corporation of Illinois Application November 21, 1938, Serial No. 241,700

21 Claims. (Cl. 10—86)

This invention relates generally to fastener units and methods of making same, and more particularly to the fastener units comprising a threaded clamping element and a lock washer secured in preassembled relation with respect to the clamping surface of the threaded element.

The present invention contemplates the provision of simple and improved fastener units and methods of producing them, wherein a lock washer is secured in preassembled relation with respect to the clamping surface of a rotary threaded fastener by a marginal interlock.

More specifically, the invention comprehends a fastener unit as set forth above, wherein the rotary threaded clamping member interlocks with a marginal flange means on the lock washer so as to secure said parts in proper preassembled relation.

A further object of the present invention is to provide preassembled threaded fasteners and lock washers, wherein swaged abutment means on the threaded fastener interlocks with a marginal flange portion on the lock washer, said swaged abutment means being provided after the lock washer has been preliminarily associated with the clamping surface of the threaded fastener.

Another object of the present invention is to provide methods whereby sections of the threaded fastener in the vicinity of the clamping surface thereof may be swaged into locking association with flange means on the lock washer, as the lock washer and threaded fastener are moved into operative association with each other.

A still further object of the invention is to provide methods for preassembling lock washers and threaded fasteners, wherein a marginal section of the lock washer is forced into the periphery of the threaded fastener so as to secure the parts in proper preassembled relation.

The foregoing and numerous other objects and advantages will be more apparent from the following detail description when considered in connection with the accompanying drawings, wherein—

Figure 1 discloses a rotary threaded fastener of the type contemplated by the present invention having protuberances in the vicinity of the clamping surface thereof, which are adapted to be swaged into interlocking relation with complementary lock washer flange means;

Figure 2 is a central transverse sectional view of a lock washer equipped with flange means which render it adaptable for interlocking, swaged association with the protuberances on the rotary threaded fastener of Figure 1;

Figure 3 is a central transverse sectional view of the threaded fastener of Figure 1 and the lock washer of Figure 2 disclosed in preliminary association with each other just prior to the swaging of the protuberances of the threaded fastener into interlocking association with the lock washer flange means;

Figure 4 is similar to Figure 3, disclosing the threaded fastener and lock washer finally secured in preassembled relation resulting from the lateral swaging of the protuberances on the threaded fastener when the parts are finally forced together;

Figure 5 is a plan view of the associated elements as shown in Figure 4;

Figure 6 is an enlarged fragmentary sectional view of the lower lefthand portion of Figure 4, to more clearly illustrate the manner in which the swaged protuberances serve to secure the lock washer in proper preassembled relation with respect to the rotary threaded clamping member or nut;

Figure 7 is a fragmentary, horizontal sectional view of the device, as shown in Figure 6, said view being taken substantially along the line 7—7 of Figure 6;

Figure 8 discloses the preassembled parts or fastener unit of Figure 4 applied to a screw and work piece;

Figure 9 discloses the application of the invention, shown in Figures 1 to 8, inclusive, to a screw fastener as distinguished from a nut, a portion of the fastener in the vicinity of the clamping surface of the head being sectioned to more clearly illustrate the manner in which the flanged lock washer is secured in preassembled relation;

Figure 10 illustrates the manner in which the invention shown in Figures 1 to 9, inclusive, may be applied to a wing nut;

Figure 11 discloses a modified embodiment of the invention wherein a lock washer of the externally toothed type may be secured by swaged elements provided along an inner periphery or margin of the threaded fastener or nut;

Figure 12 is a side elevational view of a conventional rotary threaded fastener or nut;

Figure 13 is a central transverse sectional view of a lock washer adapted to be secured in preassembled relation with respect to the nut of Figure 12;

Figure 14 discloses the lock washer of Figure 13 positioned in preliminary association with the clamping surface of the nut of Figure 12;

Figure 15 discloses the parts of Figure 14 swaged into interlocking relationship with each other, the flange of the lock washer being embedded within the corner portions of the nut;

Figure 16 is a plan view of the device shown in Figure 15;

Figure 17 is an enlarged, fragmentary sectional view of the lower left-hand portion of Figure 15, to more clearly illustrate the manner in which the flange of the lock washer interlocks with the periphery of the nut to secure the parts in proper preassembled relation;

Figure 18 is a fragmentary plan sectional view taken substantially along the line 18—18 of Figure 17; and Figure 19 discloses the lock washer and nut of Figures 15 and 16 after said parts had been secured in operative association with a work piece.

Referring now to the drawings more in detail wherein like numerals have been employed to designate similar parts throughout the various views, it will be seen that in Figures 4 to 8, inclusive, I have disclosed a fastener unit designated generally by the numeral 20, which represents one embodiment of the present invention. This fastener unit includes a rotary threaded fastener or nut 22 having the usual clamping surface portion 24, threaded portion 26, and side surfaces 28 adapted to be gripped by a suitable turning tool such as a wrench (not shown). This multisided threaded fastener 22 is provided with a plurality of protuberances 30, which before swaging occupy the positions shown in Figures 1 and 3.

These protuberances are preferably provided in the vicinity of the clamping surface 24, and at the corners presented by intersecting side surfaces 28. Attention is directed to the fact that the inner surface or area 32 on each of the protuberances 30 is inclined with respect to the vertical so as to facilitate the subsequent lateral swaging of the protuberances when the lock washer designated generally by the numeral 34 is moved into operative interlocking association therewith.

The lock washer 34 is preferably of the type formed from spring stock, and includes an annular body 36 having a plurality of resilient locking elements 38, each of which provides oppositely disposed locking teeth 40, which project above and below the plane of the body 36. In other words, the elements 38 are so flexed or twisted as to present in the aggregate a plurality of resilient locking teeth on opposite sides of the body portion, the teeth on one side adapted to embed themselves in the clamping surface 24 of the nut, and the teeth on the opposite side adapted to embed themselves within a work piece, such as the work piece 42 in Figure 8. To obtain maximum locking efficiency, I prefer to employ teeth which are designed to make a line bite into the clamping surface of the threaded fastener and the work piece.

The lock washer 34 along its outer margin is formed with flange means 44 bent axially and slightly inwardly. The inner diameter of the flange 44 is sufficient to permit clearance of the corners of the nut 22 when the parts are preliminarily associated with each other, as shown in Figure 3. As the nut and lock washer are ultimately forced into contact with each other, the harder tempered steel of the lock washer body causes the protuberances 30 to be swaged laterally into the position shown in Figures 4, 6, and 8. The inner inclined surface portions 32 of the protuberances facilitate the lateral swaging thereof as the parts are moved together, and in this final swaged position the protuberances cooperate or interlock with the flange section 44 of the lock washer so as to permanently secure the parts in proper preassembled relation. While the lock washer is secured with the teeth thereof in operative relation with respect to the clamping surface of the nut, the parts are free to rotate relatively to each other before tightening against the work piece. I prefer to have the clamping surface 24 slightly recessed with respect to the remaining clamping surface area of the nut so as to prevent the washer elements 38 from completely flattening. Thus, when the fastener unit 20 is tightened upon a screw 46 and clamped against the work piece 42, the lock washer may be firmly clamped against the work piece without the danger of completely flattening the locking elements 38. This insures the presence of a firm line bite at all times, and materially enhances the locking efficiency of the washer.

The invention as just described illustrates the practical application thereof to rotary threaded fasteners such as nuts, and in Figure 9 I have shown the practical application of the invention to screws. The fastener unit of Figure 9 is designated generally by the numeral 20a and includes a rotary threaded fastener or screw 22a having a threaded portion or shank 26a and a clamping surface 24a. The lock washer 34, as previously described, is preassembled with the screw 20a by passing the threaded shank through the washer and bringing the body portion 36 thereof into swaging association with protuberances 30a in the same manner as the lock washer 34 previously described is brought into swaging contact with the protuberances 30. The lock washer 34 is thus secured or retained in operative preassembled relation with respect to the clamping side of the screw head, and this fastener unit 20a may be transported as a unit to the point of ultimate application without any danger of disassembly.

In Figure 10 the invention heretofore described is disclosed as applied to a wing nut, the fastener unit of Figure 10 being designated generally by the numeral 20b. This fastener unit 20b includes a rotary threaded fastener or wing nut 22b provided with protuberances 30b preferably spaced along the margin of the wing nut in the vicinity of the clamping surface in the same manner as protuberances 30a are spaced along the periphery of the screw head 22a. The protuberances 30b interlock with the flange portion of the lock washer 34 to secure the parts in operative preassembled relation.

In Figure 11 I have disclosed the manner in which the present invention may be applied to lock washers of the externally toothed type, as distinguished from the internally toothed lock washer 34. The fastener unit of Figure 11 is designated generally by the numeral 20c and includes a rotary threaded fastener or nut 22c equipped with protuberances 30c provided along an inner recessed portion of the nut.

A lock washer designated generally by the numeral 48 is provided with an inner annular body portion 50 and a plurality of external locking elements 52 which are structurally similar to the internal locking elements 38 previously described. An inner flange 54 is bent axially and slightly outwardly so as to provide an interlocking abutment for the swaged protuberances 30c in the same manner as the flange 44 provides an interlocking abutment or shoulder for the protuberances 30 previously described. The inner diameter of the flange 54 obviously must be sufficient to permit the passage therethrough of the bolt or screw head to which the fastener 20c is to be applied.

It will be apparent therefore from the foregoing description that the invention contemplates an improved fastener unit wherein protuberances of the rotary threaded fastener element may be swaged into interlocking association with flange means on the lock washer so as to permanently retain the lock washer in operative preassembled relation with respect to the clamping surface of the rotary fastener. The method of preassembling the elements comprising the fastener units just described may be practiced by employing conventional machine shop tools, such as punches, dies, and the like. In fact, these fastener units may be very economically and expeditiously produced.

In Figures 12 to 19, inclusive, a modified fastener unit and method of assembling the parts thereof are disclosed. The completed fastener unit, as shown in Figures 15 and 16, is designated generally by the numeral 20d. Each fastener unit includes a conventional rotary threaded fastener or nut 22d having a clamping surface 24d and side surfaces 28d.

The lock washer element of the fastener unit 20d is designated generally by the numeral 34d and includes a spring body portion 36d having a plurality of locking elements 38d provided along the inner margin thereof. Each of these locking elements 38d presents oppositely disposed locking teeth 40d. The lock washer is also provided with a flange margin 44d having an internal diameter which is just sufficient to permit the encircling of the nut 22d.

In combining the lock washer and nut of the fastener unit 20d, the parts are first brought into preliminary association, as indicated in Figure 14. The flange section 44d is then forced inwardly by the application of suitable tools 56 indicated by dotted lines in Figure 15. The inner annular corner or edge 58 of the flange 44d embeds itself within the corner portions of the nut, thereby swaging the material of the nut into interlocking relationship with the flange. This interlocking relationship is best illustrated in the enlarged, sectional view of Figure 17. A sufficient portion of the fastener or nut stock interlocks with the inturned flange 44d so as to retain the nut and lock washer in preassembled relation.

After the fastener unit 20d has been applied to a work piece—for example, after the nut 22d is applied to the screw 46 and the lock washer teeth 40d gripped between the clamping surface of the nut and the complementary surface of the work piece 42 (Figure 19), the flange 44d has a tendency to shift outwardly to the position illustrated in Figure 19. However, any tendency to loosen the nut is counteracted by the effective locking action of the washer teeth.

From the foregoing it will be apparent that the present invention contemplates fastener units of the type wherein a marginal section of the lock washer cooperates with swaged shoulders or abutments of the fastener by employing very simple and effective methods. While the invention as described in Figures 1 to 11, inclusive, contemplates rotary fastener members, such as nuts and screws which have slight structural differences from conventional fasteners, these slight changes—such as the provision of the protuberances and the recessing of the clamping surface—may be made at the time the fasteners are produced by header dies. In other words, the slight structural changes may all be embodied in the rotary fastener element without increasing the expense of manufacture and without introducing additional steps in the method of manufacture. It will also be apparent that the invention contemplates securing lock washers to the clamping side of threaded fasteners by swaging portions of the fastener in the vicinity of the clamping surface thereof, but oppositely disposed from the free side of the lock washer. That is to say, the lock washer is not secured in place by protuberances extending beyond the inner margin thereof on the free side of the washer, but rather by protuberances extending laterally into interlocking association with flange portions of the lock washer extending away from the free side of the lock washer. The invention disclosed herein is applicable to various forms of threaded fasteners having clamping surfaces such as nuts, screws, and the like, and obviously the specific structural configuration of the protuberances on the rotary threaded fastener and the flange portion of the lock washer and the specific flange structure of the lock washer may be varied without departing from the spirit and scope of the invention set forth in the appended claims.

Having thus described my invention, what I claim as new and desire to secure by Letters Patent is:

1. A lock washer and fastener assembly including a rotary threaded fastener having a clamping surface and a lock washer receiving section in the vicinity of said clamping surface, a lock washer including a body and resilient locking teeth projecting beyond the opposite sides thereof, marginal flange means on said lock washer associated with the lock washer receiving section of said fastener, and swaged abutment means on the lock washer receiving section of said fastener interlocking with said flange means for retaining said lock washer in operative preassembled relation with respect to said clamping surface.

2. A lock washer and fastener assembly including a rotary threaded fastener having a clamping surface and a lock washer receiving section in the vicinity of said clamping surface, a lock washer including a body and resilient locking teeth projecting beyond the opposite sides thereof, inner marginal flange means on said lock washer associated with the lock washer receiving section of said fastener, and swaged abutment means on the lock washer receiving section of said fastener interlocking with said flange means for retaining said lock washer in operative preassembled relation with respect to said clamping surface.

3. A lock washer and fastener assembly including a rotary threaded fastener having a clamping surface and a lock washer receiving section in the vicinity of said clamping surface, a lock washer including a body and resilient locking teeth projecting beyond the opposite sides thereof, outer marginal flange means on said lock washer associated with the lock washer receiving section of said fastener, and swaged abutment means on the lock washer receiving section of said fastener interlocking with said flange means for retaining said lock washer in operative preassembled relation with respect to said clamping surface.

4. A lock washer and fastener assembly including a rotary threaded fastener having a clamping surface and a plurality of side surfaces adapted to be gripped by a turning tool, a lock washer including a body and resilient locking teeth projecting beyond the opposite sides thereof, axially extending marginal flange means on said lock washer, and laterally swaged flange interlocking means associated with said side surfaces and interlocking with said flange for retaining said lock washer in operative preassembled relation with respect to said clamping surface.

5. A lock washer and fastener assembly including a rotary threaded fastener having a clamping surface and a plurality of side surfaces adapted to be gripped by a turning tool, a lock washer including a body and resilient locking teeth projecting beyond the opposite sides thereof, marginal flange means on said lock washer, and flange interlocking means located at points of intersection of adjacent side surfaces and interlocking with said flange means for retaining said lock washer in permanent operative preassembled relation with respect to said clamping surface against axial displacement.

6. A lock washer and fastener assembly including a rotary threaded fastener having a clamping surface and a lock washer receiving section in the vicinity of said clamping surface, a lock washer including a body and resilient locking teeth projecting beyond the opposite sides thereof, marginal flange means on said lock washer associated with the lock washer receiving section of said fastener, and protuberances on said fastener in the vicinity of the clamping surface thereof swaged laterally into interlocking relationship with said flange means by movement of the lock washer and fastener axially into engagement with each other.

7. A lock washer and fastener assembly including a rotary threaded fastener having a clamping surface and a lock washer receiving section in the vicinity of said clamping surface, a lock washer including a body and resilient locking teeth projecting beyond the opposite sides thereof, marginal flange means on said lock washer associated with the lock washer receiving section of said fastener, and protuberances on said fastener normally extending axially beyond said clamping surface and swaged laterally into interlocking relationship with said flange means by movement of the lock washer and fastener axially into engagement with each other.

8. A lock washer and fastener assembly including a rotary threaded fastener having a clamping surface and a lock washer receiving section in the vicinity of said clamping surface a lock washer including a body and resilient locking teeth projecting beyond the opposite sides thereof, continuous marginal flange means on said lock washer associated with the lock washer receiving section of said fastener, and swaged abutment means on the lock washer receiving section of said fastener interlocking with said flange means for permanently retaining said lock washer in operative preassembled relation with respect to said clamping surface.

9. A lock washer and fastener assembly including a rotary threaded fastener having a clamping surface, a lock washer including a body and resilient locking teeth projecting beyond the opposite sides thereof, marginal flange means on said washer associated with said fastener, and a plurality of relatively small protuberances in the vicinity of said clamping surface swaged into interlocking relation with said flange means for retaining said lock washer in permanent operative preassembled relation with respect to said clamping surface.

10. A lock washer and fastener assembly including a rotary, multisided threaded fastener having a clamping surface, a lock washer including a body and resilient locking teeth projecting beyond the opposite sides thereof, marginal flange means on said washer associated with said fastener, and a plurality of relatively small protuberances in the vicinity of said clamping surface swaged into interlocking relation with said flange means for retaining said lock washer in operative preassembled relation with respect to said clamping surface, said protuberances being located at the corners presented by intersecting side surfaces of the fastener.

11. A lock washer and fastener assembly including a rotary threaded fastener having a clamping surface, a lock washer including a body and resilient locking teeth projecting beyond the opposite sides thereof, marginal flange means on said washer associated with said fastener, and a plurality of relatively small protuberances in the vicinity of said clamping surface swaged into interlocking relation with said flange means for retaining said lock washer in operative preassembled relation with respect to said clamping surface, the inner portions of said protuberances being inclined with respect to the fastener axis whereby to facilitate the lateral swaging thereof.

12. A fastener unit including a rotary threaded fastener having a clamping surface, a lock washer including a body and resilient locking teeth projecting beyond the opposite sides thereof, and marginal flange means on said lock washer having a portion thereof embedded within the outer periphery of said threaded fastener whereby to retain said lock washer in operative preassembled relation with respect to said clamping surface.

13. A fastener unit including a rotary threaded fastener having a clamping surface, a lock washer including a body and resilient locking teeth projecting beyond the opposite sides thereof, and marginal flange means on said lock washer having a portion thereof embedded within the outer periphery of said threaded fastener whereby to retain said lock washer in operative preassembled relation with respect to said clamping surface, the locking teeth of said washer being spaced from the clamping surface prior to the clamping engagement of the fastener unit with a work piece.

14. The method of preassembling a rotary threaded clamping fastener such as a screw head or nut with a lock washer having resilient teeth extending beyond opposite sides of a body portion of spring stock and flange means extending from said body portion, which consists in encircling the periphery of the threaded fastener with the lock washer flange means, and swaging adjacent portions of the flange means and fastener periphery laterally into interlocking association.

15. The method of preassembling a rotary threaded fastener such as a screw head or nut provided with protuberances extending beyond the clamping surface thereof with a lock washer having resilient teeth projecting beyond opposite sides of a body of spring stock and flange means extending from said body, which consists in preliminarily associating the lock washer and threaded fastener with the flange means positioned adjacent a periphery of said fastener, and then swaging said protuberances laterally into interlocking association with said flange means.

16. The method of preassembling a rotary threaded clamping fastener such as a screw head or nut with a lock washer having resilient teeth extending beyond opposite sides of a body portion of spring stock and flange means extending from said body portion, which consists in encircling the periphery of the threaded fastener with the lock washer flange means, and directing said flange means into embedding interengagement within the adjacent periphery of said fastener.

17. The method of preassembling a rotary threaded fastener such as a screw head or nut provided with axially extending protuberances adapted to be laterally displaced upon the application of an axial swaging force, with a lock washer having resilient teeth projecting beyond opposite sides of a body of spring stock, and axially extending flange means projecting from said body, which comprises preliminarily associating the lock washer and threaded fastener with the flange means embracing a portion of the periphery at least of said fastener, and moving said washer relatively axially to swage said protuberances laterally into interlocking association with said flange means for permanently interengaging the fastener and washer against axial displacement.

18. A lock washer and fastener assembly including a rotary threaded fastener having a clamping surface and a lock washer receiving section in the vicinity of said clamping surface, said lock washer receiving section presenting an inner annularly disposed wall structure positioned axially inwardly of said clamping surface, and a lock washer including axially extending flange means engaging said wall structure and resilient locking teeth positioned radially outward from said flange means in operative association with said clamping surface, the engagement of said flange means with said wall structure serving to retain said lock washer in operative preassembled relation with respect to the clamping surface of the fastener.

19. A lock washer and fastener assembly including an internally threaded rotary fastener having a clamping surface and a lock washer receiving section in the vicinity of said clamping surface, said lock washer receiving section presenting an inner annularly disposed wall structure positioned axially inwardly of said clamping surface, the diameter of said receiving section being larger than the maximum diameter of the threaded portion of said fastener, and a lock washer including axially extending flange means engaging said wall structure and resilient locking teeth positioned radially outward from said flange means in operative association with said clamping surface, the engagement of said flange means with said wall structure serving to retain said lock washer in operative preassembled relation with respect to the clamping surface of the fastener.

20. The method of preassembling a rotary threaded clamping fastener provided with a peripherally disposed protuberance structure in the vicinity of the clamping side thereof and a lock washer of spring stock having a continuous annular body portion and locking teeth formed integral therewith, which consists in telescopically associating said parts, said telescopic association including forcing said continuous body portion and peripheral protuberance structure into engagement, and causing, as an incident to said engagement and telescopic movement, distortion of at least one of the parts so as to secure the final positioning of the margin of said continuous body in overlying relation with respect to said peripheral protuberance structure and thereby insure said lock washer against axial displacement.

21. The method of preassembling a rotary threaded clamping fastener provided with a peripherally disposed protuberance structure in the vicinity of the clamping side thereof and a lock washer of spring stock having an inner continuous annular body portion and outer marginal locking teeth formed integral therewith, which consists in telescopically associating said parts, said telescopic association including forcing said internal continuous body portion and peripheral protuberance structure into engagement, and causing, as an incident to said engagement and telescopic movement, distortion of at least one of the parts so as to secure the final positioning of the margin of said internal continuous body in overlying relation with respect to said peripheral protuberance structure and thereby insure said lock washer against axial displacement.

CARL G. OLSON.